Dec. 15, 1970     W. H. COLLINS     3,546,945
FLUID SAMPLER

Filed Sept. 10, 1969     2 Sheets-Sheet 1

INVENTOR.
WILLIAM H. COLLINS
BY
ATTORNEY

United States Patent Office 3,546,945
Patented Dec. 15, 1970

3,546,945
FLUID SAMPLER
William H. Collins, Baton Rouge, La.
(1002 Chipley Drive, Baker, La. 70714)
Filed Sept. 10, 1969, Ser. No. 856,613
Int. Cl. G01n 1/20
U.S. Cl. 73—422                 10 Claims

ABSTRACT OF THE DISCLOSURE

Apparatus for sampling fluids from a flowing stream. The apparatus, of tubular shape, is dual compartmented, i.e., it is provided with a first and a second compartment. The first compartment is provided with a fluid inlet port and the second compartment with a fluid outlet port. The fluid inlet port is opened and closed via a rotatable disc which also contains an opening for alignment with the fluid inlet port to open and close the latter. A worm conveyor, rotatably mounted within the first compartment, actuates the disc. The worm conveyor is operatively connected, via suitable gearing mechanism, preferably variable, located within the second compartment, to external fluid actuable driving means. The moving stream, from which the sample is taken, actuates the worm conveyor itself so that the rotating disc opens and closes the fluid inlet port in the first chamber to admit increments or spurts of fluid into the first chamber. Simultaneously, fluid is expelled through the outlet port for collection.

---

The necessity of obtaining truly representative samples from such streams, however, increases almost daily. The increasing demands for the elimination of polluting materials from streams is now constantly heard even by lay persons from day-to-day. Elimination of such materials from streams must begin with truly representative samples for analysis.

Accordingly, it is the primary objective of the present invention to obviate these and other problems by providing new and improved apparatus for accurately sampling the fluid of flowing streams.

In particular, it is an object to provide an apparatus for sampling flowing streams, the fluid being withdrawn therefrom being obtained in accurate and direct proportion to the velocity of flow of the stream.

More particularly, it is an object to provide apparatus of such character adapted for location within a pipe or conduit for sampling the flowing fluid.

A further object is to provide apparatus of such character which is directly actuated by the movement or flow of the fluid, so that the sample obtained is not significantly affected, if any, by variations of temperature and pressure.

A yet further and more specific object is to provide a fluid sampler or device capable of selectively positively withdrawing increments of fluid from a flowing stream, over a period, for delivery of same to provide a composite fluid specimen representative of the total sampled stream.

These and other objects are achieved in accordance with the apparatus of the present invention which comprises a dual compartmented cylindrical chamber of tubular design with stationary end walls and stationary intermediate wall. The forward wall of the first chamber contains a fluid inlet port, and within the said first chamber is journalled a worm conveyor, including a central shaft surrounded by a helical screw or blade. A perforated disc, provided with a fluid inlet port, is secured to the forward end of the worm conveyor and a flat side thereof lies adjacent the forward wall of the first chamber to form a seal and also a valve. As the disc rotates with the screw conveyor, alignment and misalignment of the inlet ports of the forward wall and disc thus occur, this opening and closing the chamber to the intake of fluid. A fluid outlet port is provided within the said first chamber.

Means are provided external to the chambers for actuation by the flowing stream. Such means is preferably a rotary member, or members, whose angular velocity of rotation is in direct proportion to the rate of flow of the fluid. The means thus contemplates on more rotary members provided with concave surfaces—viz., disked cups, paddles, or the like—upon which the fluid impinges. The rotary members are operatively connected to or associated with coupling or gearing means located within the second compartment, as via a shaft extending into the said second compartment, for actuation and rotation of the worm conveyor.

Actuation of, e.g., the rotary member, or members, by the flowing stream thus produces a rotation of the worm conveyor directly proportional to the rate of flow of the moving stream. The inlet ports of the forward wall and disc open and close the first chamber and, by the forceful action of the rotating worm conveyor, increments or spurts of fluid are positively selectively withdrawn from the stream. Simultaneously, fluid is displaced and forcibly ejected through the outlet port of the first chamber for collection.

These and other features and advantages will be better understood by reference to the following detailed description and to the accompanying drawings to which reference is made in the description.

Referring to the drawings.

Figure 1:
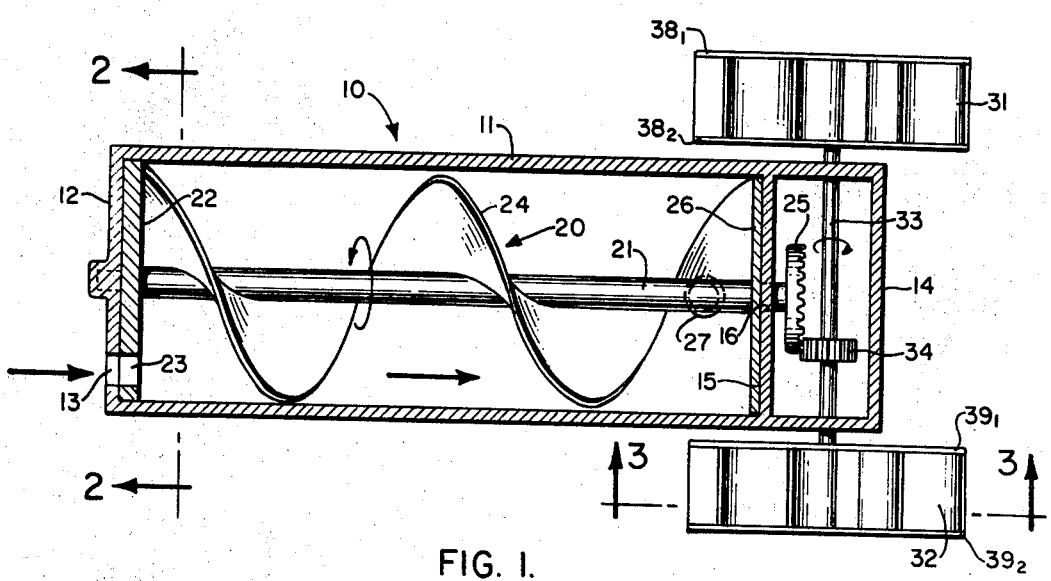
FIG. 1 is a plan view, in partial section, showing a preferred type of fluid sampler wherein fluid responsive means are actuated by the fluid of the flowing stream itself to positively selectively withdraw increments of fluid from the said stream for delivery at controlled rates.

Referring to FIG. 1, there is shown a preferred fluid sampler 10, which includes generally the combination of a worm conveyor 20 fitted snugly within a barrel or tubular chamber 11, the worm conveyor 20 being driven by fluid responsive means, preferably a pair of paddle-wheel drivers 31, 32 mounted on a shaft 33 operatively associated with a shaft portion 21 of the worm conveyor.

The stationary end wall 12 of the tubular chamber 11 is provided with one or a plurality of openings 13, as is an adjacent disc 22 which contains an opening 23. The opening 13, in combination with the rotating disc 22 with its opening 23, acts as a valve. The disc 22 is thus rotated by actuation of the worm conveyor 20, so that upon alignment of the openings 13, 23 increments of fluid are sucked into, or positively withdrawn from, the stream and brought into the tubular chamber 11. The increments of fluid are thereby isolated from the moving fluid of the stream and discharged to provide a composite specimen representative of the total stream during a sampling period.

Figure 2:
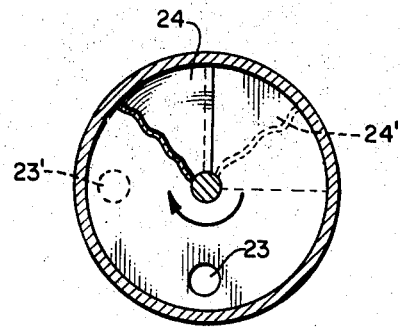
FIG. 2 is a front elevation view, taken along section 2—2 of the preceding figure showing the details of a valve arrangement at the forward end of the fluid sampler to provide for ingress of fluid into the forward chamber thereof.

A suitable housing is provided by a dual compartmented cylindrical chamber defined by the enclosing side wall of a tubular member 11, enclosing end walls 12, 14 and an intermediate wall 15 provided with a central opening 16. The forward end wall 12, or end wall of the hereinafter designated first chamber, is stationary, and provided with one or a plurality of openings of desired size, in this instance a single inlet port 13. A rotatable disc 22, also provided with one or a plurality of openings of desired size, in this instance an inlet port 23, is located within the forward end of the first chamber, a flat face thereof being adjacent or contiguous to the end wall 12. Rotation of the disc 22 aligns and misaligns the inlet ports 13, 23 to open and close the said chamber for positive forcible withdrawal of fluid from the stream. The open position of the valve to permit ingress of fluid into the first chamber is shown by reference to FIGS. 1 and 2. The phantom lines shown by reference to FIG. 2 specifically shows the misalignment of ports 13, 23 to effect closure of the valve. Reference to the figure thus shows movement of inlet port 23 to a position 23' to effect closure of the valve, while during the same interval of time the helical blade 24 moves to position 24'.

The worm conveyor 20 is comprised of a shaft 21, a helical screw or blade 24, and in essence the assembly includes also the disc 22. The shaft 21, which lies along the central axis of the first (and second) chamber, is rigidly affixed at one end to the center of the disc 22, and the other is journalled upon and passed through the central opening 16 through the intermediate stationary wall 15. The portion of the shaft 21 which extends through the central opening 16, and into the second compartment is provided with a gear drive 25. Preferably, the worm conveyer 20 is also provided with a second disc 26, rigidly affixed to a terminal end of the helical blade 24, through which is passed the shaft 21. The flat side of the second disc 26 is also located contiguous to and adjacent the forward side of intermediate wall 15 to provide an effective leak-proof seal.

It is to be observed that the diameters of the discs 22, 26 are commensurate in size with the internal diameter of the chamber. Such sizing in the case of the forward disc 22, and the use of a rigid construction material, simplifies the design by eliminating any necessity of having to journal the forward end of shaft 21 to the stationary outer wall 12, and satisfactory alignment of the inlet ports 13, 23 is assured. The external diameter of the helical blade 24 is substantially equal to the internal diameter of the chamber, this assuring better positive pressure for withdrawing fluid through inlet ports 13, 23 upon their alignment, and for forcing fluid out of the chamber via outlet port 27.

Means located outside the chamber, in contact with and responsive to, the motion of the flowing streams is operatively associated with, coupled or geared to the worm conveyor 20, the latter being actuated in direct proportion to the rate of flow of the moving stream. A drive shaft 33 located within the second compartment is thus operatively connected to or otherwise associated with the shaft 21 of the worm conveyor 20, and with externally located fluid actuated means, supra, preferably a fluid actuated rotary device. The drive shaft 33, journalled within the side wall of the tubular member 11, is preferably provided with at least one, and more preferably a pair of, fluid actuated paddlewheels 31, 32 located externally, one on each side of the fluid sampler, for better stability. The function of the paddlewheels 31, 32 is to rotate the drive shaft 33, and consequently shaft 21, of the worm conveyer 20. Whether front or rear drive, relative to the direction of flow of the stream, or with respect to the location of the said first and second chambers is immaterial. Either is permissible. In a simple gearing arrangement shown by reference to FIG. 1, the paddlewheel drive shaft 33 is thus provided with a gear drive 34 which is meshed with the worm conveyer gear drive 25 so that fluid actuation of the paddlewheels 31, 32 produces rotation of the worm conveyer 20.

Figure 3:
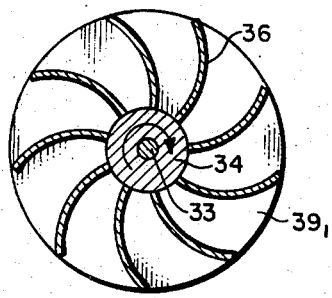
FIG. 3 is a side elevation view, taken along section 3—3 of FIG. 1, showing the details of a preferred type of externally located means for actuation by the flowing stream.

It will be observed by specific reference to FIG. 3 that each of the paddlewheels 31, 32 is constituted of a drum 34, 35 (not shown) from a peripheral surface of which is radially extended a plurality of evenly spaced blades or vanes 36, 37 (not shown) curved with their concave sides (or conversely, their convex sides) in a common direction so that the paddlewheels 31, 32 will rotate in one direction only. The circular members $38_1$, $38_2$, $39_1$, $39_2$ mounted on each side of a drum 34, 35 serve as shields for protection of the vanes 36, 37.

Figure 5:
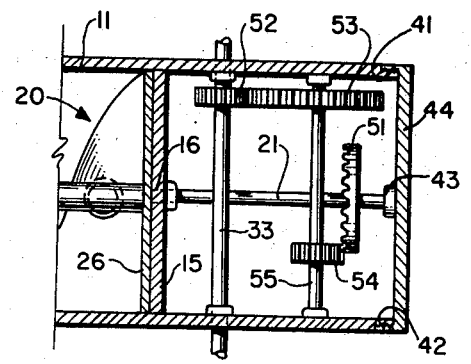
FIG. 5 is a fragmentary section view of a preferred type of variable gear arrangement, with removable end cover for ease of access, for predetermined sample withdrawal frequency, and delivery.

A preferred type of variable gearing combination or arrangement for predetermination of the sample take-off frequency is provided by a gearing arrangement which operatively connects the paddlewheel drive shaft 33 and worm conveyer shaft 21, this being shown by specific reference to FIG. 5. The variable gearing arrangement includes a more greatly extended worm conveyer shaft 21 which is journalled within the central opening 16 of the intermediate wall 15, and within a central opening 43 of a removable cover plate 44. The cover plate 44, which replaces the former stationary end wall 14, provides ease of access for changing or repairing the gear mechanism and is conveniently fixed in place via threaded engagement between external threads 41 of the cover plate 44 and the internal threads 42 of the side wall of the tubular member 11.

The worm conveyer shaft 21 carries a gear 51, as does the paddlewheel shaft 33, which carries the gear 52. The rate of revolution of the worm conveyer shaft 21, however, is determined not directly by the speed of rotation of the paddlewheel shaft 33 but rather by the gear ratio between paddlewheel gear 52 and speed reduction gears 53, 54 which rotate upon a specially provided gear shaft 55. The rate of rotation of the worm conveyer shaft 21 relative to the rate of rotation of the paddlewheel shaft 33 is thus conveniently set by the gear ratio between the paddlewheel shaft gear 52 and the gear 53 in accordance with well known principles. The larger the diameter of the gear 53 relative to the diameter of the paddlewheel shaft gear 52, the slower the gear support shaft 55 is turned and consequently the slower the worm conveyer shaft 21 is turned for a given gear ratio between gear 54 and worm conveyer shaft gear 51. Conversely, the smaller the diameter of the gear 53 relative to the diameter of the paddlewheel shaft gear 52, the faster the rate of revolution of the worm conveyer 20.

Figure 4:
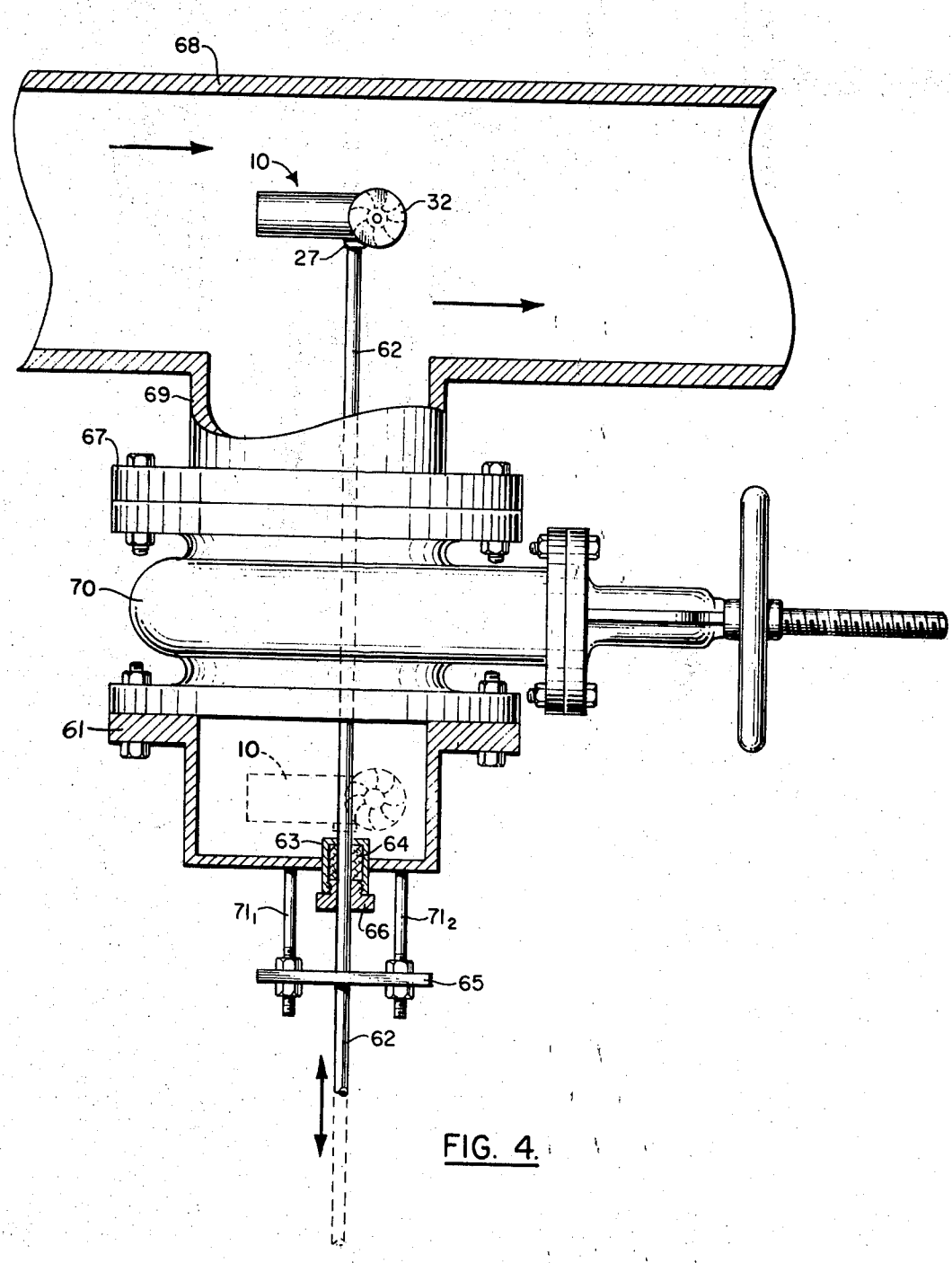
FIG. 4 is a side elevation view showing means for the mounting of the fluid sampler within a conduit for withdrawal of fluid samples for delivery to an isolated collection stage.

The apparatus of this invention, as suggested by reference to FIG. 4, is conveniently installed in any flowing stream, e.g., a pipe, flume, ditch or spillway. When installing the device within, e.g., a pipe 68, it is usually passed through a pipe nozzle 69 which contains a gate valve 70. In the installation, a gate valve 70 is located between the nozzle 69 and a flanged plate 61, the latter being bolted upon the flanged portion 67 of the gate valve. The plate 61 is provided with a recess and, with the device positioned therein, it is bolted to the closed gate valve. The gate valve is then opened and the device manualy projected through the gate valve and pipe nozzle 69 into operating position within the pipe. A rigid tube 62, as desired, is used to connect the outlet port 27 with a sample take-off station located outside the pipe. The tube 62 is thus passed through a stuffing box 63, containing a packing 64 and tightening bolt 66 for effecting a seal. The tube ending can be threaded, and threadably engaged, if desired, to a support bracket 65 which is coupled with the flanged plate 61 via suitable bolt connections $71_1$, $71_2$, $71_3$ (not shown), spaced apart at 120° intervals. A container (not shown) is connected to the tube outlet via flexible hose or tubing, as may be desired.

In operation, the frequency of withdrawal of the increments of fluid from the moving stream is predetermined, of course, not only by the physical size of the device but in particular by the ratios of the installed gears. The movement of the fluid supplies the activating force for rotation of the paddlewheels 31, 32, and consequently the rotary motion of the worm conveyor 20. As the worm conveyor 20 revolves, it brings the inlet port 23 of the disc 22 in line with the inlet port 13 in the forward end wall 12, thereby opening the first chamber. Fluid is withdrawn from the stream, the quantity thereof being determined by the velocity of flow of the sampled stream. Fluid is withdrawn and discharged via the outlet port 27 under the positive action of the worm conveyor 20. The withdrawal of fluid from the stream continues until the chamber is closed by the inlet ports 13, 23 moving out of alignment. The withdrawal of fluid is continued as the inlet ports 13, 23 again come into alignment and so on ad infinitum as long as sampling continues.

A feature of the device is that the amount of fluid withdrawn is directly proportional to the rate of flow of the sampled stream. Fluid pressure and temperature, or variations thereof, have no significant effect on sampling and hence even the velocity of fluid flow can be determined by use of this device calibrated in advance, to accurately measure the total quantity of sample taken during a timed period.

EXAMPLE

By way of illustration, tests have been conducted wherein samples have been taken of fluid flowing through a conduit, in which the described device was installed. Pursuant to these tests it has been found that a constant sample quantity has been obtained of 0.075 ounce of fluid at sample frequencies of 5, 10, 20, 50, 100 and 150 withdrawals of fluid per minute, by weight. Pressures in the pipe varied from 150 p.s.i.g. to 300 p.s.i.g. at each frequency with no change in sample quantity. Controlled velocities of 1, 3 and 5 feet per second were used.

Another unit was operated at 50 samples per minute for a period of 1000 hours with fluid at 150 p.s.i.g. pressure, with no measurable variation of sample quantity.

The apparatus of the present invention can be constructed of essentially any material substantially inert to chemical or corrosive action by the fluid, or contaminating elements. The entire apparatus can be conveniently constructed of various metals, e.g., ferrous metals such as iron, iron alloys, steel, stainless steel, and the like; or, e.g., brass, copper, bronze, chrome, and the like. The materials can be of solid or laminar construction, and can be provided with a protective film, coated, plated, or the like; particularly, those films known to be unreactive or impervious to known chemicals contained in the sample fluid. Rigid and semi-rigid forms of plastics, and plastic-like materials can also be employed, these materials being particularly desirable especially in the construction of the helical portion of the worm conveyer and associated sealing components. The self-lubricated plastics are especially preferred in this capacity, and are also especially suitable for application in the form of protective films. The polyfluorinated ethylene polymers, notable among which is polytetrafluoroethylene (Teflon), are particularly outstanding.

It is apparent that various changes, such as in absolute or relative dimension of the parts, materials used and the like, as well as the suggested mode of taking samples, can be made without departing the spirit and scope of the invention, as will now be apparent to those skilled in the art.

Having described the invention, what is claimed is:

1. In apparatus for sampling the fluid of a flowing stream wherein fluid responsive means are actuated to intermittently open and close an inlet for withdrawal of increments of fluid from the stream the combination comprising a dual compartmented cylindrical chamber defined by the side wall of a tubular member, with enclosing end walls, and an intermediate wall provided with a central opening, a fluid outlet port located within the first compartment, a fluid inlet port located within the end wall of the first compartment, a disc, also provided with a fluid inlet port, located within the first compartment with a flat side adjacent the end wall of the said compartment, a worm conveyer comprising a shaft lying along the central axis of the said first compartment, said shaft being rigidly affixed at one end to the center of said disc and the other extending through the central opening of the said intermediate wall, a helical blade surrounding said shaft of external diameter substantially equal to the internal diameter of the said first compartment, gear means located at the end of said shaft extending through the central opening of the intermediate wall, and into the second compartment, a drive shaft extending through the side wall of the tubular member and into the second compartment, a gear drive interconnected with said drive shaft, said gear drive being operatively associated with the gear means of the worm conveyer shaft, and fluid actuated means located outside the chambers, operatively associated with the said gear drive, whereby contact of the fluid actuated means by the flowing stream causes rotation of the drive shaft and gear drive and consequently the worm conveyer shaft, this in turn actuating the worm conveyer causing rotation of the helical blade and disc, intermittent alignment of the fluid inlet ports of the rotating disc and end wall of the first compartment, so that increments of fluid proportional to the rate of flow of the moving stream are positively selectively withdrawn from the stream via the positive action of the helical blade and passed through the fluid outlet port of the first compartment to provide a composite fluid specimen representative of the total stream during a sampling period.

2. The apparatus of claim 1 wherein the disc is of diameter equal to the internal diameter of the first chamber, the disc being rotatably held in place by the end of the shaft.

3. The apparatus of claim 2 wherein the disc is constructed at least in part of polyfluorinated ethylene polymer.

4. The apparatus of claim 1 wherein the fluid actuated means located outside the chambers comprises a pair of paddlewheels, located on the drive shaft, one on each side of the said second chamber.

5. The apparatus of claim 1 wherein the fluid outlet port is provided with a sample take-off line extending through a fluid-impervious partitioning device to a remote area.

6. The apparatus of claim 5 wherein the fluid-impervious partitioning device comprises a recessed flanged plate for operative connection with a nozzle wall of a pipe conduit, the center of said plate being provided with a stuffing box, packing and tightening bolt through which the sample take-off line is extended.

7. The apparatus of claim 1 wherein a variable gearing arrangement for predetermination of the sample take-off frequency is provided, this including the combination comprising the worm conveyer shaft which is journalled within the central opening of the intermediate wall and to the end wall of the second compartment, and gear means located on said worm conveyer shaft, the drive shaft which extends through the side wall of the tubular member and into the second compartment, and a gear drive interconnected with said drive shaft, a separate gear shaft extending through the side wall of the tubular member and into the said second compartment, said gear shaft carrying variable sized speed reduction gears, one meshed with the gear drive of the drive shaft for driving the said gear shaft at an angular velocity predetermined by the ratio of the gear diameters, while the other is meshed with the gear means of the worm conveyer shaft to drive the worm conveyer at a desired speed of rotation relative to the flowing stream.

8. The apparatus of claim 7 wherein the end wall of the second compartment upon which the worm conveyer shaft is journalled is a removable cover.

9. The apparatus of claim 8 wherein the removable cover is threadably engageable with the side wall of the second chamber.

10. The apparatus of claim 7 wherein the variable gear directly operatively meshed with the gear drive of the drive shaft is of larger diameter than the latter.

References Cited

UNITED STATES PATENTS

| | | | |
|---|---|---|---|
| 1,927,871 | 9/1933 | Irwin et al. | 73—425.2 |
| 1,964,270 | 6/1934 | Nidever et al. | 73—422 |
| 2,729,105 | 1/1956 | McFarland et al. | 73—422(TC) |
| 2,784,594 | 3/1957 | Struck | 73—422(TC) |
| 2,906,126 | 9/1959 | Brown | 73—422(TC) |
| 3,129,590 | 4/1964 | Ellis | 73—424 |
| 3,162,049 | 12/1964 | Blanchard | 73—421(B) |
| 3,218,866 | 11/1965 | Struck | 73—422(TC) |
| 3,383,924 | 5/1968 | Cordell | 73—422 |

LOUIS R. PRINCE, Primary Examiner

H. C. POST III, Assistant Examiner

U.S. Cl. X.R.

73—424